United States Patent [19]
Moussouris et al.

[11] Patent Number: 5,113,506
[45] Date of Patent: * May 12, 1992

[54] SYSTEM HAVING AN ADDRESS GENERATING UNIT AND A LOG COMPARATOR PACKAGED AS AN INTEGRATED CIRCUIT SEPERATE FROM CACHE LOG MEMORY AND CACHE DATA MEMORY

[75] Inventors: John P. Moussouris, Palo Alto; Lester M. Crudele, San Jose; Steven A. Przybylski, Menlo Park, all of Calif.

[73] Assignee: MIPS Computer Systems, Inc., Mountain View, Calif.

[*] Notice: The portion of the term of this patent subsequent to Aug. 28, 2007 has been disclaimed.

[21] Appl. No.: 491,114

[22] Filed: Mar. 9, 1990

Related U.S. Application Data

[63] Continuation of Ser. No. 827,269, Feb. 6, 1986, Pat. No. 4,953,073.

[51] Int. Cl.⁵ .................. G06F 9/34; G06F 12/10; G06F 13/16
[52] U.S. Cl. .................. 395/400; 364/232.8; 364/240.2; 364/243.4; 364/243.41; 364/252.6; 364/256.3; 364/256.4; 364/256.5; 364/259.2; 364/DIG. 2
[58] Field of Search ... 364/200 MS File, 900 MS File

[56] References Cited

U.S. PATENT DOCUMENTS

| | | | |
|---|---|---|---|
| 4,056,845 | 11/1977 | Churchill | 364/200 |
| 4,084,230 | 4/1978 | Matick | 364/200 |
| 4,400,774 | 8/1983 | Toy | 364/200 |
| 4,464,233 | 2/1984 | Weatherford | 364/200 |
| 4,493,026 | 1/1985 | Olnowick | 364/200 |
| 4,523,587 | 7/1985 | Roskell et al. | 364/200 |
| 4,527,232 | 7/1985 | Bechtolsheim | 364/200 |
| 4,587,610 | 5/1986 | Rodman | 364/200 |
| 4,794,524 | 12/1988 | Carberry et al. | 364/200 |
| 4,882,673 | 11/1989 | Witt | 364/200 |
| 4,953,073 | 2/1990 | Moussouris et al. | 364/200 |
| 4,989,140 | 1/1991 | Nishimukai et al. | 364/200 |

FOREIGN PATENT DOCUMENTS 0231574 12/1987 European Pat. Off.

OTHER PUBLICATIONS

Kaplan, "Cache-based Computer Systems", *Computer*, Mar. 1973 at 30-36.
Rhodes, "Cache-Memory Functions Surfaces on VLSI chip", *Electronic Design*, Feb. 18, 1982, at 159.
Rhodes, "Cache Keep Main Memories from Slowing Down Fast CPUs", *Electronic Design*, Jan. 21, 1982, at 179.
Strecker, "Cache Memories for PDP-11 Family Computers", in Beel, *Computer Engineering*, (Digital Press), at 263-67.
Cushman, "Enhances Mups Bring New Life to Old Devices", *Electrical Design News*, 30: 124-138 (Jan. 1985).
Goodman, "Using Cache Memory to Reduce Processor-Memory Traffic", *Proceedings of the 10th Annual Symposium on Computer Architecture*, Jun. 1983, pp. 124-31.
VanAken, "Match Cache Architecture to the Computer System", *Electronic Design*, Mar. 4, 1982, at 93.
Sachs, "A High Performance 846,000 Transistor UNIX Engine—The Fairchill Clipper", *Proceedings of the IEEE International Conference on Computer Design*, Oct. 1985 at 342-46.
Brandt et al., "High Speed Buffer With Dual Directories", *IBM Technical Disclosure Bulletin*, 26: 6264-6265 (May 1984).

*Primary Examiner*—Thomas C. Lee
*Assistant Examiner*—William M. Treat
*Attorney, Agent, or Firm*—Kenyon & Kenyon

[57] ABSTRACT

A cache-based computer architecture is disclosed in which the address generating unit and the tag comparator are packaged together and separately from the cache RAMs. If the architecture supports virtual memory, an address translation unit may be included on the same chip as, and logically between, the address generating unit and the tag comparator logic. Further, interleaved access to more than one cache may be accomplished on the external address, data and the tag busses.

8 Claims, 4 Drawing Sheets

| PHASE | EXECUTION UNIT | INSTRUCTION ATU | DATA ATU | EXTERNAL ADDRESS BUS | TAG BUS | DATA BUS |
|---|---|---|---|---|---|---|
| 0 | PREPARE VIRTUAL INSTRUCTION ADDR | | | | | |
| 1 | PREPARE VIRTUAL DATA ADDR | TRANSLATE INSTRUCTION ADDR | | | | |
| 2 | PREPARE VIRTUAL INSTRUCTION ADDR | | TRANSLATE DATA ADDR | LOW-ORDER OF REAL INSTR. ADDR | | |
| 3 | PREPARE VIRTUAL DATA ADDR | TRANSLATE INSTRUCTION ADDR | | LOW-ORDER OF REAL INSTR. ADDR | TAG FROM INSTR. CACHE TAG RAM | DATA FROM INSTR. CACHE DATA RAM |
| 4 | PREPARE VIRTUAL INSTRUCTION ADDR | | TRANSLATE DATA ADDR | LOW-ORDER OF REAL INSTR. ADDR | TAG FROM DATA CACHE TAG RAM | DATA FROM DATA CACHE DATA RAM |
| 5 | PREPARE VIRTUAL DATA ADDR | TRANSLATE INSTRUCTION ADDR | | LOW-ORDER OF REAL INSTR. ADDR | TAG FROM INSTR. CACHE TAG RAM | DATA FROM INSTR. CACHE DATA RAM |
| 6 | PREPARE VIRTUAL INSTRUCTION ADDR | | TRANSLATE DATA ADDR | LOW-ORDER OF REAL INSTR. ADDR | TAG FROM DATA CACHE TAG RAM | DATA FROM DATA CACHE DATA RAM |
| 7 | PREPARE VIRTUAL DATA ADDR | TRANSLATE INSTRUCTION ADDR | | LOW-ORDER OF REAL INSTR. ADDR | TAG FROM INSTR. CACHE TAG RAM | DATA FROM INSTR. CACHE DATA RAM |

FIG. 4

SYSTEM HAVING AN ADDRESS GENERATING UNIT AND A LOG COMPARATOR PACKAGED AS AN INTEGRATED CIRCUIT SEPERATE FROM CACHE LOG MEMORY AND CACHE DATA MEMORY

This application is a continuation of application Ser. No. 06/827,269, filed Feb. 6, 1986, now U.S. Pat. No. 4,953,073.

BACKGROUND

1. Field of the Invention

The invention relates to computer architectures, and more particularly to computer architectures which employ a cache RAM.

2. Description of Related Art

Modern day computer designs frequently include a very large main memory address space which interfaces with a CPU via a cache memory. Good descriptions of the various uses of and methods of employing caches appear in the following articles: Kaplan, "Cache-based Computer Systems," *Computer*, 3/73 at 30–36; Rhodes, "Caches Keep Main Memories From Slowing Down Fast CPUs," *Electronic Design*, Jan. 21, 1982, at 179; Strecker, "Cache Memories for PDP-11 Family Computers," in Bell "*Computer Engineering*" (Digital Press), at 263–67.

In one form, a cache memory comprises a high speed data RAM and a parallel high speed tag RAM. The location address of each entry in the cache is the same as the low order portion of the main memory address to which the entry corresponds, the high order portion of the main memory address being stored in the tag RAM. Thus, if main memory is thought of as $2^m$ blocks of $2^n$ words each, the i'th word in the cache data RAM will be a copy of the i'th word of one of the $2^m$ blocks in main memory. The identity of that block is stored in the i'th location in the tag RAM. When the CPU requests data from memory, the low order portion of the address is supplied as an address to both the cache data and tag RAMs. The tag for the selected cache entry is compared with the high order portion of the CPU's address and, if it matches, the data from the cache data RAM is enabled onto the data bus. If the tag does not match the high order portion of the CPU's address, then the data is fetched from main memory. It is also placed in the cache for potential future use, overwriting the previous entry. On a data write from the CPU, either the cache RAM or main memory or both may be updated, it being understood that flags may be necessary to indicate to one that a write has occurred in the other. The use of a small, high speed cache in the computer design permits the use of relatively slow but inexpensive RAM for the large main memory space, by taking advantage of the "property of temporal locality," i.e., the property inherent in most computer programs wherein a memory location referenced at one point in time is very likely to be referenced again soon thereafter.

A cache memory architecture can be thought of as comprising three basic building blocks or modules: a unit for generating addresses (which may comprise an entire CPU), cache data and tag RAMs for storing the recently used information, and tag comparator logic for determining whether a hit or miss has occurred. In older architectures, these three modules were typically disposed on separate chips or even separate boards. This posed several problems. First, a speed penalty was incurred due to the length of the wires connecting the various chips together. This penalty is becoming more important as semiconductor memory and logic speeds increase. Second, whenever a signal is sent off-chip, the drivers are limited in their switching speed because very high currents will create too much inductive switching noise in the power supply for the remainder of the circuits to tolerate. Third, the need for many chips increases costs both because board space is expensive, and also because the total cost of many devices is greater than the total cost of a few highly integrated devices. Additionally, these older architectures were often designed to require a cache hit signal before cache data was enabled onto the data bus. Data would therefore not appear on the data bus until three delay periods were exhausted serially: the time required to read the tag RAM, the time required to compare it to the high-order portion of the address, and the time required to enable data from the data cache RAM onto the data bus.

More recently, Texas Instruments began manufacturing a chip, called the TMS2150, which includes both the cache tag RAM and the tag comparator logic together on the same chip. This chip is described in Rhodes, "Cache-Memory Functions Surface on VLSI Chip," *Electronic Design*, Feb. 18, 1982, at 159. The TMS2150 reduces some of the chip boundary crossings in the prior implementation, but not enough. The full memory address must still be sent out to the 2150, requiring a potentially disruptive driver for each bit. Additionally, the architecture shown as FIG. 5 of the above article continues to show data from the cache data RAMs being enabled onto the data bus only after a match is detected by the 2150.

It has also been suggested that all three of the modules described above be integrated onto the same chip. See, for example, Goodman, "Using Cache Memory to Reduce Processor-Memory Traffic," *Proceedings of the 10th Annual Symposium on Computer Architecture*, 6/83, pp. 124–131, at 125; VanAken, "Match Cache Architecture to the Computer System," *Electronic Design*, Mar. 4, 1982, at 93. Whereas this would eliminate all chip boundary crossings, it is not very practical for two reasons. First, the size of the cache RAMs would have to be too small to yield a reasonable hit rate. Second, it prevents the designer from taking advantage of advances in memory technology that occur during the computer design cycle. Regardless of what technology is chosen at the beginning of the design cycle, it will be outdated when the computer reaches the production stage. If the tag and data RAMs are implemented off-chip, whatever products were initially expected to fill those sockets could simply be replaced by the faster, denser, cheaper and cooler-running chips likely to be available when the computer reaches the production stage. This cannot be done if the RAMs are incorporated into the CPU chip.

Fairchild's "Clipper" chip set implements a similar type of organization. See Sachs, "A High Performance 846,000 Transistor UNIX Engine—The Fairchild Clipper," *Proceedings of IEEE International Conference on Computer Design*, 10/85, at 342–46 for a description. The Clipper chip set includes three chips: a CPU, an Instruction Cache And Memory Management Unit (ICAMMU) and a Data Cache And Memory Management Unit (DCAMMU). The ICAMMU integrates cache RAMs, a tag comparator and a translation lookaside buffer (discussed below) on one chip. It also integrates a copy of the CPU's program counter, so that instruction address information need be transmitted to the ICAMMU only on program branches. The Clipper implementation is similar to the fully integrated approach in that the address generating unit (the copy of the program counter) is on the same chip as the cache RAMs and tag comparator. But in order to make the cache RAMs as large as they are, the CPU had to be moved off-chip. Full virtual addresses must therefore cross a chip boundary from the CPU to ICAMMU whenever a branch takes place. Additionally, as with the fully integrated approach, a designer using the Clipper chip set cannot take advantage of the advances that occur in memory technology during the computer design cycle.

Read/write cycle times are further increased if the computer has virtual memory capability. In such computers, each of a number of different tasks address memory as if the other tasks were not present. In order to accomplish this, main memory is divided into blocks or "pages," one or more of which can be assigned to each task at any given time. When a task references a "virtual" memory address, the address must be translated into a real address in the proper page of main memory. Only the high order bits of the virtual address must be translated, however, since the low order bits are the same for each page. Thus, since a typical page size is 4k bytes, all but the low order 12 bits of the virtual address must usually be translated for each main memory access.

Virtual memory capability can be implemented in a cache system in any of several configurations, none of which have been altogether satisfactory. In one configuration, an address translation unit (ATU) is placed between the address generating unit and the cache memory. This configuration introduces significant overhead because every access to the cache is delayed by the time needed to go through the address translation unit. A second possibility is to set the cache length equal to or less than the virtual page length, such that only the untranslated low order address bits are needed to address it. The Clipper chip set, described above, uses this configuration. However, this usually limits cache length to a size too small to provide a reasonable hit rate. The cache size limitation can be overcome by adding set associativity (two or more tag/data RAM pairs in parallel) to the cache RAM organization, but this requires that set selection logic be added to the tag comparator logic to determine which cache data RAM to enable onto the data bus once a match is detected. This additional layer of logic further degrades performance.

A third possible configuration involves using virtual addresses to address a long, direct mapped (single set) cache, and translating the addresses to real addresses only when it becomes necessary to access main memory. But this has other problems which reduce its overall efficiency. First, in a multitasking environment, all the tasks usually address an overlapping group of virtual addresses, though these usually correspond to different real addresses for each task. The principle of locality continues to apply to each task individually, but it no longer applies to all tasks running together. A cache entry addressed and updated by one task is likely to be addressed and updated by a second task before the first can benefit from its presence nearby. Set associativity can be used to offset this problem, but many sets may be necessary to match the performance of a computer with a direct mapped real addressed cache. The necessary set selection logic also degrades performance.

Second, in situations where I/O is performed in the form of direct modification of main memory contents, it is necessary to flag the corresponding cache entry, if one exists, to indicate that it no longer contains valid data. However, since the cache is accessed by virtual addresses, the real address of the memory location modified must be reverse translated to determine which if any cache entry corresponds. The schemes employed to overcome this problem add significantly to the complexity of the computer memory control logic and the software overhead

SUMMARY OF THE INVENTION

It is an object of the present invention to propose a computer architecture not subject to the above difficulties.

It is another object of the present invention to propose a cache-based computer architecture.

It is another object of the present invention to propose a cache-based computer architecture which minimizes chip boundary crossings.

It is another object of the present invention to propose a cache-based computer architecture in which cache data is available on the data bus even before a match is detected.

It is another object of the present invention to propose a virtual memory computer architecture with a direct mapped cache.

The above objects and others are accomplished according to the invention by integrating the tag comparator logic on the same chip as the address generating module, and disposing the cache tag and data RAMs externally to that chip. An address translation unit may be included on the same chip as, and logically between, the address generating unit and the tag comparator logic if the computer architecture includes virtual memory. Further, if the computer architecture separates instruction and data memory, separate instruction and data caches may be employed with interleaved bus access.

BRIEF DESCRIPTION OF THE DRAWINGS

The invention will now be described with reference to particular embodiments thereof, it being understood that many other embodiments not described are nevertheless within the scope of the invention. The embodiments will be described with reference to the drawings, in which:

FIG. 4 is a timing table for the embodiment of FIG. 3.

DETAILED DESCRIPTION

Figure 1:
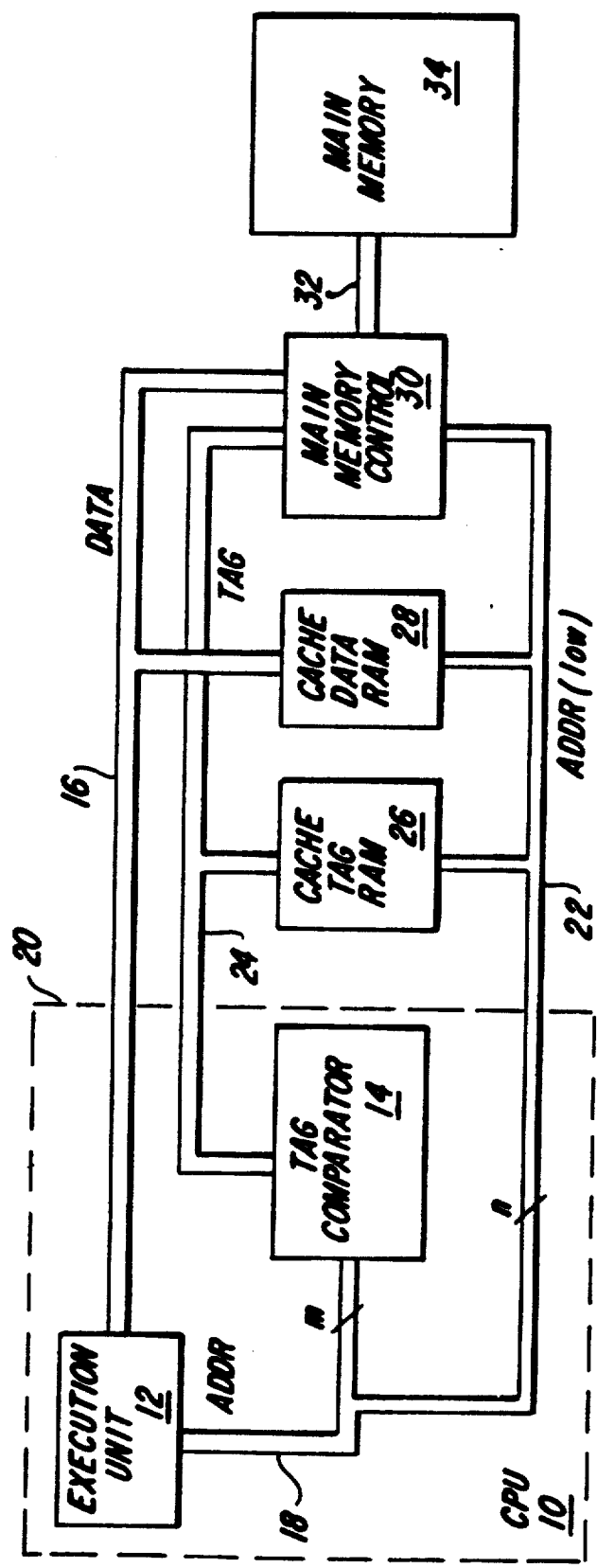
FIGS. 1-3 are block diagrams of various embodiments according to the invention.

In FIG. 1 there is shown a block diagram of a computer system incorporating the present invention. It comprises a CPU chip 10 having an execution unit 12 and a tag comparator 14 integrated thereon. The execution unit 12 is connected to a data bus 16 and an internal address bus 18. The high order m bits of the internal address bus 18 are connected to the tag comparator 14, and the low order n bits pass across the CPU chip boundary 20 and are connected to an external address bus 22. The data bus 16 also traverses the CPU chip boundary 20 to become an external data bus. The tag comparator 14, in addition to being connected to the high order m bits of the internal data bus 18, is also connected to a tag bus 24 having a width of m bits. The tag bus 24 also crosses the CPU chip boundary 20. External to the CPU chip 10 are a cache tag RAM 26, a cache data RAM 28 and a main memory control unit 30. The cache tag RAM 26 is connected to the external address bus 22 and the tag bus 24; the cache data RAM 28 is connected to the external address bus 22 and the data bus 16; and the main memory control unit 30 is connected to the external address bus 22, the tag bus 24 and the data bus 16. The main memory control unit 30 is also connected via a bus 32 to the main memory 34.

In operation, the execution unit 12 produces an address onto the internal address bus 18. The n low order bits of that address are transmitted along the external address bus 22 and supplied as an address to the cache tag and data RAMs 26 and 28, respectively. If a read is being performed, a data word is enabled from the cache data RAM 28 onto the data bus 16 after a delay equal to the access time of the RAM. This data is transmitted to the execution unit 12 where operations begin immediately. At roughly the same time that data from the cache data RAM 28 is enabled onto the data bus 16, the contents of the cache tag RAM 26 at the selected entry are enabled onto the tag bus 24. Such contents include the high order m bits of the main memory address to which the selected entry corresponds, as well as a flag (NV) indicating whether the selected data is nonvalid, and possibly one or more parity bits. The tag comparator 14 compares the tag on the tag bus 24 with the m high order address bits on the internal address bus 18 to determine whether a cache hit or miss has taken place. A miss condition also occurs if the NV bit is set, or possibly if a parity bit is wrong. If a hit has taken place, then the operations which have already begun in the execution unit 12 are allowed to continue. If a miss has taken place, then the desired data is fetched from main memory 34 via the main memory control logic 32. The cache tag and data RAMs 26 and 28 are updated after the new data arrives.

If a write is being performed, the new data is put out on the data bus 16 and the full address is put out on the tag and external address busses 24 and 22. The new information may also at the same time written through to main memory 34 via the main memory control logic 30.

The structure of FIG. 1 has several advantages over prior art structures. First, unlike the situation where the three basic modules are in separate packages, this structure requires only two chip boundary crossings on a cache read: one from the CPU 10 to the cache tag and data RAMs 26 and 28 along the external address bus 22, and one from the tag and data RAMs 26 and 28 back to the CPU 10 along the tag and data busses 24 and 16. Of these two crossings, only the address information from the CPU 10 requires high current drivers; the two RAMs usually have low fanout outputs, causing minimal inductive switching noise in the CPU 10. The interconnection wires may be made as short as desired to reduce transmission line delays. Additionally, chip count can be kept very low.

Second, since the structure of FIG. 1 includes the tag comparator logic on the CPU chip 10, a hit or miss will be detected and the execution unit 12 notified very soon following the arrival of the tag information on-chip. Since the data on the external data bus 16 and the tag on the tag bus 24 can be expected to arrive at the CPU chip 10 at about the same time, the execution unit 12 can begin operating on the data immediately (in parallel with the work of the tag comparator logic 14) without fear of becoming too deeply committed to abort and restore itself if the cache access turns out to be a miss.

Third, only the low order n bits of the internal address bus 18 are sent outside the chip. If all three modules were separately packaged, or even if the tag comparator logic and the cache RAMs were packaged together but separate from the execution unit 12, the full m + n bits of the address would have to be sent out. The structure of FIG. 1 therefore reduces the number of high current drivers needed. For example, if the internal address bus 18 is 32 bits wide and the cache memories are 64k entries long, prior art structures would require all 32 address bits to be sent outside the chip. The structure of the present invention, however, would require only 16 bits to be sent out, resulting in a reduction in switching noise of almost one-half. Overall pin count is not reduced because the remaining 16 address bits in effect are sent back to the CPU 10 over the tag bus 24. As mentioned previously, however, the tag RAM 26 outputs are not high fanout outputs and do not inject significant switching noise into the power supply.

Fourth, the structure of FIG. 1 represents an improvement over fully integrated and TMS2150-type designs because the designer can benefit from advances in memory technology occurring during the computer design cycle simply by replacing the cache RAMs 26 and 28 with newer versions. Moreover, the cache RAMs can be made as large as desired simply by adding memory and widening the external address bus 22 accordingly. It should be noted that whereas modern memory technology supports reasonably priced direct mapped caches large enough to yield a reasonable hit rate, it may be desired to expand the memory by adding set associativity. This can be accomplished according to the invention by widening the tag bus 24 to accommodate m bits for each cache set, and by adding set selection logic to the tag comparator 14. The actual selection of data can then be accomplished off-chip, perhaps in a manner that enables initially the data from one cache set until told otherwise, but it is preferred that it be accomplished on-chip because of the speed benefits that would result. If done on-chip, the data bus 16 would of course have to be widened accordingly.

Figure 2:
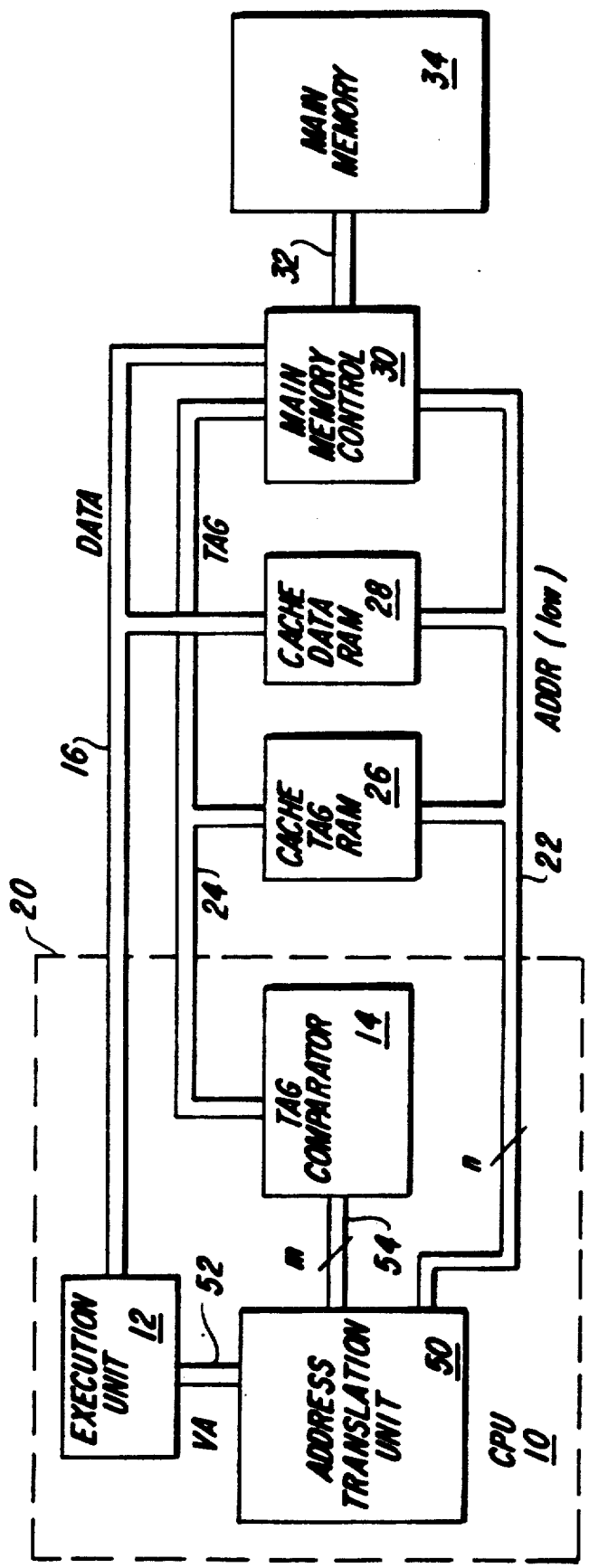

In FIG. 2 there is shown a block diagram of another computer system according to the invention, this one incorporating a virtual memory architecture. It is much the same as the embodiment of FIG. 1, except that an address translation unit 50 has been inserted on the CPU chip 10 between the execution unit 12 and the tag comparator 14. The execution unit sends a virtual address over a virtual address (VA) bus 52 to the address translation unit 50. The address translation unit 50 translates this to a real address of width m + n bits, the low order n bits of which are sent off-chip to the cache RAMs 26 and 28 over the external address bus 22. The high order m bits are sent over an internal real address (RA) bus 54 to the on-chip tag comparator logic 14. The address translation unit 50 may comprise a page table (not shown), and/or a translation lookaside buffer (TLB) (not shown). If the address translation unit 50 includes a TLB, which is in substance merely a cache for the page table, the page table may be located off-chip.

Integrating the address translation unit on the CPU chip provides several advantages over the prior art structures even above those advantages gained by using the invention on a design that does not have virtual memory. Since the translation is performed on-chip, it can be made fast enough to minimize overhead even though a translation is performed for each cache memory access. Overhead can be further reduced by designing the execution unit 12 so as to generate the virtual addresses very early in the instruction cycle. This permits the use of real addressed caches, thereby avoiding all the difficulties introduced by the use of virtual addressed caches. Additionally, since the address translation is so fast, the high order (translated) bits of the real address arrive at the CPU package boundary only a short time after the low order (untranslated) bits. Direct mapped cache RAMs of a length greater than the virtual memory page size can therefore be used without severe penalty. The penalty can be eliminated, in fact, if cache RAMs having early row or column select capability are used.

Figure 3:
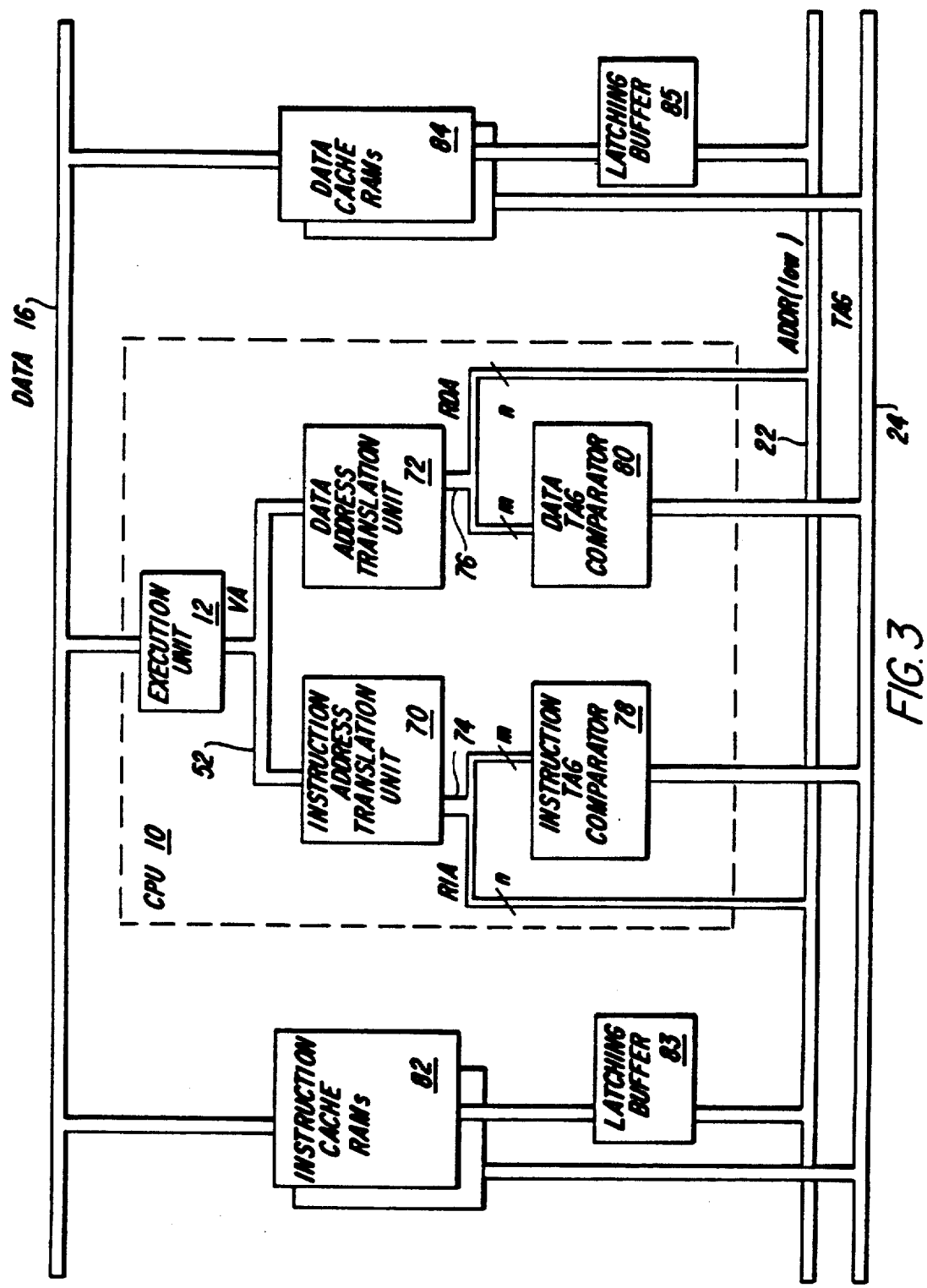

FIG. 3 shows yet another embodiment of the present invention, particularly adapted for computer designs which differentiate between instruction memory and data memory. For such designs, two separate caches may be used with interleaved bus usage to effectively double the cache access bandwidth and gain some of the benefits of two-way set associativity without adding overhead. FIG. 3 shows inside the CPU chip 10 the execution unit 12, connected via the virtual address bus 52 to both an instruction address translation unit 70 and a data address translation unit 72. The instruction address translation unit 70 is connected to a real instruction address (RIA) bus 74 of width m +n bits and the data address translation unit 72 is connected to a real data address (RDA) bus 76 of the same width. The m high order bits of the RIA bus 74 are connected to an instruction tag comparator 78 and the m high order bits of the RDA bus 76 are connected to a data tag comparator 80. The n low order bits of the RIA bus 74 and the n low order bits of the RDA bus 76 are both connected to the external address bus 22, and the m bits of the external tag bus 24 are connected to both the instruction tag comparator 78 and the data tag comparator 80. External to the CPU chip 10 are one direct mapped set of instruction cache RAMs 82 and one direct mapped set of data cache RAMs 84. These are connected to the data, tag and external address busses 16, 24, and 22, respectively, as previously described, except that latching buffers 83 and 85 are inserted between the external address bus 22 and, respectively, the instruction cache RAMs 82 and the data cache RAMs 84. The main memory control logic 30 and the main memory 34 are not shown in FIG. 3.

In operation, an instruction address is first provided by the execution unit 12 onto the internal virtual address bus 52. During the first phase of a two-phase clock cycle (see FIG. 4), the instruction address translation unit 70 calculates the corresponding real address and makes it available to the instruction tag comparator 78 and to the external address bus 22. Also during this first phase, the execution unit 12 readies a virtual data address for placing on the virtual address bus 52. In the second phase, the low order n bits of the real instruction address is put out on the external address bus 22 and latched by latching buffer 83. The instruction cache RAMs 82 begin to select the data and tag information stored at the selected address. Also during the second phase the data address translation unit 72 translates the virtual data address on the virtual address bus 52, and the execution unit 12 readies the next virtual instruction address. In the third phase (first phase of second clock cycle), the data and tag from instruction cache RAMs 82 are placed on the data and tag busses 16 and 24 for use by the execution unit 12 and the instruction tag comparator 78, respectively. Also during this third phase, the n low order bits of the real data address are put out on the external address bus 22 and latched by latching buffer 85. The data cache RAMs 84 begin to select the data and tag information stored at the selected address. The instruction address translation unit 70 also translates the virtual instruction address to real, and the execution unit 12 readies the next virtual data address. Cache access continues in this interleaved manner until it is interrupted by a cache miss which requires access to main memory, or by another specified condition. Thus, although the data from a cache read does not arrive at the execution unit 12 until one and one-half clock cycles after the virtual address for that data was first available on-chip, cache accesses are completed twice each clock cycle. This results in a doubling of the bandwidth over that obtainable with single cache systems, even though address translation is performed for every cache access.

Other improvements and refinements may be incorporated into computer systems employing the present invention. For example, since the address translation units 70 and 72 are small and integrated together with the execution unit 12 and the tag comparators 78 and 80 on the CPU chip 10, they operate significantly faster than does the cache access itself. This is true especially if one or more TLB levels are used in the translation scheme. It may therefore be possible to perform the translation for both caches in a single joint double-time address translation unit. Additionally, other specialized caches, such as an external TLB, or an instruction cache dedicated to an operating system kernal, may be connected to the external address, tag and data busses 22, 24 and 16. These may be accessed when the busses are temporarily not in use due to a translation miss, cache miss, or other special processor condition. Moreover, an external latching buffer such as those shown as 83 and 85 in FIG. 3 may be included in non-interleaved designs as well. This has the benefit of moving the powerful address drivers off the CPU chip, while adding only a small delay to overall cache access time.

Although in the above description the address generating unit and the comparator logic are described as being located on one chip and the cache RAMs being located elsewhere, it will be understood that similar benefits will result if the address generating unit and the comparator logic are located on different chips within the same hybrid package, the cache RAMs being located elsewhere. The benefits do not, however, extend to the situation where the address generating unit and the comparator logic are located in separate packages on one board and the cache RAMs located on a different board. The latter situation places each of the three basic building blocks of a cache architecture in different packages, thereby incurring all of the disadvantages described previously with respect to such a structure. No further advantage is gained by placing the cache RAMs off-board that is not already gained by placing them off-chip. Performance is in fact degraded by placing them off-board, because transmission line considerations begin to play a more important role.

The invention has been described with respect to particular embodiments thereof, and it will be understood that numerous modifications are possible within the scope of the invention. For example, although embodiments have been described in which the n bits sent out on the external address bus are the low order address bits, it will be understood that any group of n bits may be selected. Additionally, an overlap may be built in between the address bits connected to the tag comparator and those available externally for cache addressing. The latter variation permits a designer or user to select one of several available cache lengths merely by allocating the overlap bits between the two functions. As another example, although the interleaved embodiment described above involved the use of an instruction cache and a data cache, it will be understood that any pair of non-interfering streams of memory accesses could be accommodated. Interleaving access to more than two caches might also be possible. In yet another example, if more than one cache is accessed, there is no requirement that all use the full data, address and/or tag bus widths. As yet a further example, the tag information may be sent back to the CPU 10 on the external address bus 22 if the bus width is appropriate and an external latch is used. These and other modifications obvious to a person of ordinary skill are intended to be within the scope of the invention.

What is claimed is:

1. A computer system comprising:
   an integrated chip having an address generating unit for generating address signals, a tag comparator unit and a first connection means coupled to the address generating unit and including a first group of address leads connected to said tag comparator unit, and a second group of address leads for outside connection;
   first cache memory means including a first cache data memory and a first cache tag memory each disposed externally to the integrated chip;
   data bus means in communication with said first cache data memory and said address generating unit;
   tag bus means in communication with said tag comparator and said first cache tag memory; and
   address bus means coupling said first cache tag memory and said first cache data memory to said second group of address leads.

2. A computer system according to claim 1, wherein the first connection means includes:
   virtual address bus means in communication with the address generating unit; and
   an address translation unit in communication with the virtual address bus means.

3. A computer system according to claim 1, further comprising second cache memory means comprising a second cache data memory and a second cache tag memory, the second cache data memory being in communication with the second group of address leads and with the data bus means and the second cache tag memory being in communication with the second group of address leads and with the tag bus means, wherein the second cache memory means is disposed externally to the integrated chip.

4. A computer system according to claim 2, further comprising second cache memory means comprising a second cache data memory and a second cache tag memory, the second cache data memory being in communication with the second group of address leads and with the data bus means and the second cache tag memory being in communication with the second group of address leads and with the tag bus means, wherein the second cache memory means is disposed externally to the integrated chip.

5. A computer system according to claim 1, further comprising:
   means for enabling tag information from the first cache tag memory onto the tag bus means during a predetermined phase of a clock cycle; and
   means for enabling data corresponding to said tag information from the first cache data memory onto the data bus means during said predetermined phase of said clock cycle.

6. A computer system according to claim 2, further comprising:
   means for enabling tag information from the first cache tag memory onto the tag bus means during a predetermined phase of a clock cycle; and
   means for enabling data corresponding to said tag information from the first cache data memory onto the data bus means during said predetermined phase of said clock cycle.

7. A computer system according to claim 2, wherein at least one lead in the second group of address leads represents a translated address bit and at least one lead in the second group of address leads represents an untranslated address bit.

8. A computer system according to claim 4, wherein at least one lead in the second group of address leads represents a translated address bit and at least one lead in the second group of address leads represents an untranslated address bit.

* * * * *